United States Patent [19]
Riedel et al.

[11] Patent Number: 6,127,510
[45] Date of Patent: Oct. 3, 2000

[54] CARBODIIMIDE POLYMERS AS PRECURSORS FOR C/N AND B/C/N MATERIALS

[75] Inventors: Ralf Riedel, Babenhausen; Edwin Kroke, Pfungstadt; Axel Greiner, Leonberg, all of Germany

[73] Assignee: Bayer Aktiengesellschaft, Leverkusen, Germany

[21] Appl. No.: 09/367,291

[22] PCT Filed: Feb. 4, 1998

[86] PCT No.: PCT/EP98/00584

§ 371 Date: Aug. 10, 1999

§ 102(e) Date: Aug. 10, 1999

[87] PCT Pub. No.: WO98/35921

PCT Pub. Date: Aug. 20, 1998

[30] Foreign Application Priority Data

Feb. 17, 1997 [DE] Germany .................. 197 06 028

[51] Int. Cl.$^7$ .................. C08G 79/08; C08G 79/12; C01B 21/06; C01B 21/64; C04B 35/58
[52] U.S. Cl. .................. 528/170; 528/28; 528/30; 556/403; 501/88; 501/90; 501/96.1; 501/96.5; 423/290; 264/667; 264/669
[58] Field of Search .................. 528/170, 28, 30; 264/667, 669; 423/290; 556/103; 501/88, 90, 96.1, 96.5

[56] References Cited

U.S. PATENT DOCUMENTS

| | | | |
|---|---|---|---|
| 4,581,468 | 4/1986 | Paciorek et al. | 556/403 |
| 5,039,632 | 8/1991 | Riedel et al. | 501/92 |
| 5,081,078 | 1/1992 | Petzow et al. | 501/97 |
| 5,162,272 | 11/1992 | Peuckert et al. | 501/96 |
| 5,294,574 | 3/1994 | Riedel et al. | 501/88 |
| 5,863,462 | 1/1999 | Riedel et al. | 252/315.1 |

FOREIGN PATENT DOCUMENTS 4430817  3/1996  Germany .

*Primary Examiner*—P. Hampton-Hightower
*Attorney, Agent, or Firm*—Joseph C. Gil; Richard E. L. Henderson

[57] ABSTRACT

Novel C/N— and B/C/N polymers which can be obtained by reaction of (a) a carbodiimide having the formula $R_3E-NCN-ER_3$, in which R includes a group selected from the group consisting of alkyl groups and aryl groups, and E comprises a component selected from the group consisting of Si, Ge, and Sn, and (b) a halogenotriazine. Methods for making and using said polymers.

7 Claims, No Drawings

CARBODIIMIDE POLYMERS AS PRECURSORS FOR C/N AND B/C/N MATERIALS

BACKGROUND OF THE INVENTION

The present invention relates to novel C/N— and B/C/N polymers which can be obtained by reaction of carbodiimides $R_3E$—NCN—$ER_3$ (R=alkyl, aryl; E=Si, Ge, Sn) with halogenotriazines and their use for producing C/N and B/C/N materials.

DE-OS (German Published Specification) 44 30 817 discloses polymeric ceramic precursors which are obtainable by reaction of bis(trialkylsilyl)carbodiimide with halides of groups IIIA, IVA and VA of the Periodic Table. In particular, the reaction of bis(trimethylsilyl)carbodiimide with silicon tetrachloride is described there.

It has now been found that novel polymers can be prepared by reaction of carbodiimides of the type $R_3E$—NCN—$ER_3$ (R=alkyl, aryl; E=Si, Ge, Sn) with halogenotriazines.

DESCRIPTION OF THE INVENTION

The reaction of cyanuric halides (2,4,6-trihalogeno-s-triazines) with silyl, germyl and stannyl carbodiimides leads to new, infusible pulverulent polymers which are suitable for conversion into carbon nitrides, in particular $C_3N_4$. Borazine halides react analogously to form polymers from which boron carbonitrides can be obtained by thermolysis.

To prepare the C/N and B/C/N polymers of the invention, use is made of silyl, germyl or stannyl carbodiimides of the type $R_3E$—NCN—$ER_3$, where R symbolizes an alkyl or aryl group, in particular a methyl, ethyl, propyl, isopropyl, butyl, isobutyl, tert-butyl, hexyl, octyl, phenyl or benzyl group, and E represents silicon, germanium or tin.

The carbodiimides are reacted with halogenotriazines. These can be cyanuric halides

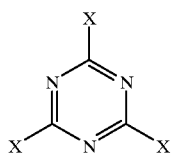

or borazine halides

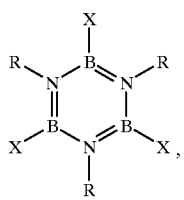

where X can be fluorine, chlorine, bromine or iodine and R represents hydrogen atoms or alkyl or aryl radicals, in particular H or methyl, ethyl, propyl, isopropyl, butyl, isobutyl, tert-butyl, hexyl, octyl, cyclohexyl, phenyl or benzyl groups.

The formation of the polymers of the invention is catalysed by addition of a base. As catalyst, preference is given to pyridine in amounts of from 0 to 2 equivalents, preferably from 0.1 to 2 equivalents, based on the molar amount of cyanuric halide or borazine halide.

The C/N polymers of the invention are formed according to the following overall reaction:

The formation of the B/C/N polymers of the invention occurs analogously:

The preparation of the C/N and B/C/N polymers of the invention can be carried out either in the absence of solvents or in water-free, inert solvents, e.g. THF, diethyl ether or toluene. For a given solvent and a given starting material combination, the reaction time depends on the amount of base added and the reaction temperature, in general, the reaction times are from 1 to 240 hours, preferably from 1 to 96 hours, and the reaction temperatures are from 20 to 180° C., preferably from 20 to 110° C.

The C/N and B/C/N polymers of the invention are usually obtained as powders and can, after their preparation, be subjected to a drying step in which volatile reaction products, catalyst and any solvent are removed. This is preferably carried out under reduced pressure, at temperatures of from 0° C. to 150° C.

Products free of end groups can be obtained by calcination in vacuo or in an $N_2$ or noble gas atmosphere (e.g. argon, helium) at temperatures of up to 450° C. Hard materials or (functional) ceramics can be produced from the polymers of the invention by pyrolysis or high-pressure pressing at pressures of up to 20 GPa in an $N_2$, Ar or He atmosphere. For this purpose, the polymers are, in a procedure similar to diamond production, converted into three-dimensional crosslinked hard material phases in high-pressure presses or by shock-wave compression at pressures of <10 kbar and temperatures of <200° C. The novel materials can be used wherever cemented carbides, ceramics such as c-BN or SiC and diamond are utilized as abrasives or for cutting, drilling and milling applications (i.e. for cutting machining operations).

The invention is further described in the following illustrative examples in which all parts and percentages are by weight unless otherwise indicated.

EXAMPLES

All reactions were carried out in baked-out glass apparatus in a water-free argon atmosphere. The IR (KBr pressed disc) and Raman specimens were prepared and measured in a protective gas atmosphere. The STA measurements (Netzsch 429 with Balzers QMG 420 mass spectrometer) were carried out in an argon atmosphere; the heating rate was 2 K/min.

Example 1

Carbon nitride polymer from cyanuric fluoride and bis(trimethylsilyl)carbodiimide 5.0 g (37 mmol) of cyanuric fluoride were weighed into a 100 ml protective gas flask and 50 ml of toluene followed by 10.4 g (55.5 mmol) of bis(trimethylsilyl)carbodiimide were added. 0.5 ml (6.2 mmol) of pyridine were added and the mixture was heated to boiling. A yellow, flocculent precipitate formed. After 1 hour, the solvent and the volatile constituents of the reaction mixture were distilled off under reduced pressure, giving a yellow, air-sensitive powder.

The thermal behaviour of the polymer was studied by means of simultaneous thermal analysis (STA) in the temperature range from room temperature to 1000° C. under argon. A 20% mass loss occurred between 200 and 400° C. In the temperature range from 650 to 700° C., the substance decomposed into nitrogen (m/e=28) and $C_2N_2$ (m/e=42).

A sample which had been heated at 400° C. for 0.5 hour had an olive-green colour and was air-sensitive like the yellow product.

The following data were determined on the heat-treated sample:

FT-IR (KBr pressed disc): $\nu[cm^{-1}]$=3130, 3077, 2181, 1570, 1338, 1198, 806.

Raman: $\nu[cm^{-1}]$=1627

Elemental analysis: C, 34.48%; N, 47.70%; H, 1.50%; the remaining 16.32% are accounted for by the elements F, Si and 0 (<3%) as could be demonstrated by means of EDX.

Example 2
Carbon nitride polymer from cyanuric fluoride and bis (trimethylsilyl)carbodiimide 5.82 g (43 mmol) of cyanuric trifluoride, about 35 ml of toluene and 16.06 g (86 mmol) of bis(trimethylsilyl) carbodiimide were mixed in a 100 ml protective gas flask. After addition of 4.92 g (62 mmol) of pyridine, the mixture was heated to boiling, with a fine yellow precipitate being formed. After 5 hours, the solvent and the volatile constituents of the reaction mixture were slowly distilled off via a 15 cm Vigreux column. During this distillation, the temperature rose to about 140° C. and a fine olive-green powder remained. This polymer was dried and pyrolysed in three stages: 4 h/5×10$^{-3}$ mbar/180° C., 9 h/5×10$^{-3}$ mbar/225° C. and 0.5 h/6×10$^{-2}$ mbar/380° C. The brown, pulverulent product was characterized by means of FTIR, XRD, C/H/N analysis and ESCA:

FT-IR (KBr pressed disc): $\nu[cm^{-1}]$=3122, 3070, 2181, 1634, 1557, 1316, 823, 809, 763, 662.

XRD: amorphous (no reflections)

Elemental analysis: C, 37.47%; N, 42.74%; H, 1.59%. ESCA: C, 50.1 %; N, 44.3%; F, 4.2%; Si, 0.1%; O, 1.1%.

Example 3
Carbon nitride polymer from cyanuric fluoride and bis (trimethylsilyl)carbodiimide (without solvent)

2.44 g (18 mmol) of cyanuric trifluoride, 21.25 g (0.11 mol) of bis(trimethylsilyl)carbodiimide and 0.5 ml (6.2 mmol) of pyridine were mixed in a 50 ml protective gas flask. The mixture was heated at the boiling point for 60 hours, with a yellow-green precipitate being formed. The colourless liquid was decanted off and the residue was dried and pyrolysed in two stages. 125° C./2×10$^{-2}$ mbar/1.5 h and 300° C./21×10$^{-2}$ mbar/1 h. The product was a fine, brown powder.

Fr-IR (KBr pressed disc): $\nu[cm^{-1}]$=2175, 1550, 1320, 802.

Elemental analysis: C, 43.74%; N. 45.97%; H, 1.78%. EDX found about 1.5% of F and about 3% of O in the polymer.

Example 4
Carbon nitride polymer from cyanuric chloride and bis (trimethylsilyl)carbodiimide (without solvent and without catalyst)

1.24 g (6.7 mmol) of cyanuric trichloride and 20.85 g (112 mmol) of bis(trimethylsilyl)carbodiimide were mixed in a 100 ml protective gas flask. The mixture was heated at the boiling point for 10 days while stirring. A yellow solid was formed during this time. The volatile constituents of the reaction mixture were distilled off at 170° C./10$^{-2}$ mbar. A sample which had been heated at 400° C./10$^{-2}$ mbar/0.5 h had a yellow-brown colour.

Fr-IR (KBr pressed disc): $\nu[cm^{-1}]$=2955, 2901, 2195, 1646, 1580, 1420, 1306, 1214, 836, 817, 760, 700, 633.

Elemental analysis: C, 39.11%; N, 42.48%; H, 4.29%. About 10% of Si were found by means of XRF analysis. Chlorine was not detectable.

Example 5
Carbon nitride polymer from cyanuric chloride and bis (trimethylsilyl)carbodiimide (without solvent and without catalyst)

In a 20 ml glass ampoule, 2.0 g (10.8 mmol) of cyanuric trichloride and 4 g (21.6 mmol) of bis(trimethylsilyl) carbodiimide were mixed and melted under vacuum. The mixture was heated at 160° C. for 10 days. A yellow solid was formed during this time. The ampoule was opened under protective gas and the volatile constituents of the reaction mixture were distilled off at 185° C./3×10$^{-2}$ mbar/ 10 h. A yellow, air-sensitive solid was again obtained and its IR and analytical data after pyrolysis at 400° C./10$^{-2}$ mbar/ 0.5 h corresponded to the values given in Example 4.

Example 6
B/C/N polymer from borazine trichloride and bis (trimethylsilyl)carbodiimide In a 250 ml three-necked flask, 3.9 g (21.2 mmol) of B-trichloroborazine which had previously been sublimed under protective gas were dissolved in 50 ml of water-free THF, and 7.9 g (42.4 mmol) of bis(trimethylsilyl) carbodiimide were added. The mixture was heated to boiling while stirring. After 2.5 hours, a shape-stable gel had been formed. After 5 hours, the product was dried at 140° C./10$^{-2}$ mbar/2.5 h and at 190° C./10$^{-2}$ mbar/0.5 h, with considerable shrinkage being observed. The product was a white, glassy, very hard solid.

FT-IR (KBr pressed disc): $\nu[cm^{-1}]$=3420, 2192, 1394, 1253, 1062, 845, 757, 699.

Elemental analysis: C, 23.01%; N, 45.0%; B, 16.35%; Cl, 4.75%; Si, 6.3%; O, 1.79%.

A reaction without solvent and with an excess of bis (trimethylsilyl)carbodiimide gave an analogous result.

Although the present invention has been described in detail with reference to certain preferred versions thereof, other variations are possible. Therefore, the spirit and scope of the appended claims should not be limited to the description of the versions contained therein.

What is claimed is:

1. A polymer comprising the reaction product of
   (a) a carbodiimide having the formula

wherein R comprises a group selected from the group consisting of alkyl groups and aryl groups, and E comprises a component selected from the group consisting of Si, Ge, and Sn, and (b) a halogenotriazine.

2. The polymer of claim 1, wherein the halogenotriazine used comprise a cyanuric trihalide.

3. The polymer of claim 1, wherein the halogenotriazine used comprise borazine halide.

4. A method for making a hard material comprising the step of subjecting a polymer to pyrolysis conditions, wherein the polymer comprises the reaction product of (a) a carbodiimide having the formula $$R_3E\text{—}NCN\text{—}ER_3,$$

wherein R comprises a group selected from the group consisting of alkyl groups and aryl groups, and E comprises a component selected from the group consisting of Si, Ge, and Sn, and (b) a halogenotriazine.

5. The method of claim 4, wherein the hard material produced comprises a ceramic.

6. A method for making a hard material comprising the step of subjecting a polymer to high pressure pressing conditions at pressures of up to 20 GPa, wherein the polymer comprises the reaction product of (a) a carbodiimide having the formula $$R_3E\text{—}NCN\text{—}ER_3, \text{ and}$$

(b) a halogenotriazine, wherein R comprises a group selected from the group consisting of alkyl groups and aryl groups, and E comprises a component selected from the group consisting of Si, Ge, and Sn.

7. The method of claim 6, wherein the hard material produced comprises a ceramic.

* * * * *